(12) United States Patent  
Tamida et al.

(10) Patent No.: US 9,550,245 B2  
(45) Date of Patent: Jan. 24, 2017

(54) ELECTRIC DISCHARGE MACHINING APPARATUS, ELECTRIC DISCHARGE MACHINING METHOD, AND SEMICONDUCTOR SUBSTRATE MANUFACTURING METHOD

(75) Inventors: Taichiro Tamida, Tokyo (JP); Takashi Hashimoto, Tokyo (JP); Akihiko Iwata, Tokyo (JP); Tatsushi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 752 days.

(21) Appl. No.: 13/002,999

(22) PCT Filed: Jul. 23, 2009

(86) PCT No.: PCT/JP2009/063198  
§ 371 (c)(1),  
(2), (4) Date: Jan. 7, 2011

(87) PCT Pub. No.: WO2010/010927  
PCT Pub. Date: Jan. 28, 2010

(65) Prior Publication Data  
US 2011/0114604 A1    May 19, 2011

(30) Foreign Application Priority Data  
Jul. 24, 2008   (JP) .................................. 2008-190742

(51) Int. Cl.  
*B23H 1/02* (2006.01)

(52) U.S. Cl.  
CPC .............. *B23H 1/028* (2013.01); *B23H 1/022* (2013.01); *B23H 2300/20* (2013.01)

(58) Field of Classification Search  
USPC ................................ 219/69.13, 69.18, 69.17  
See application file for complete search history.

(56) References Cited

U.S. PATENT DOCUMENTS 2,759,088 A * 8/1956 Lincoln ..................... 219/69.17  
2,783,411 A * 2/1957 Matulaitis .............. B23H 1/028  
                                                              219/69.16

(Continued)

FOREIGN PATENT DOCUMENTS

CA        1122266    *  4/1982  
CN        2732408 Y     10/2005

(Continued)

OTHER PUBLICATIONS

Magara translation '916.*

(Continued)

*Primary Examiner* — David Angwin  
*Assistant Examiner* — Frederick Calvetti  
(74) *Attorney, Agent, or Firm* — Oblon, McClelland, Maier & Neustadt, L.L.P.

(57) ABSTRACT

An electric discharge machining apparatus includes: electrodes the total quantity of which is equal to N; an alternating-current power source; and capacitors the total quantity of which is equal to N. The alternating-current power source applies an alternating voltage commonly to the electrodes. One end of each of the capacitors is connected to a corresponding one of the electrodes, whereas the other ends of the capacitors are commonly connected to the alternating-current power source.

5 Claims, 7 Drawing Sheets

(56) References Cited

U.S. PATENT DOCUMENTS

| | | | | |
|---|---|---|---|---|
| 3,472,994 A | * | 10/1969 | Sennowitz | 219/69.13 |
| 3,485,987 A | * | 12/1969 | Porterfield | B23H 1/022 |
| | | | | 219/113 |
| 3,496,321 A | * | 2/1970 | Lobur | 219/69.13 |
| 3,536,881 A | * | 10/1970 | Inoue | B23H 1/022 |
| | | | | 219/69.13 |
| 3,627,967 A | * | 12/1971 | Bertolasi | H02H 7/00 |
| | | | | 219/69.13 |
| 4,193,852 A | | 3/1980 | Inoue | |
| 4,347,424 A | * | 8/1982 | Obara | 219/69.13 |
| 4,347,425 A | * | 8/1982 | Obara | 219/69.13 |
| 4,382,168 A | * | 5/1983 | Inoue | 219/69.17 |
| 4,441,004 A | * | 4/1984 | Inoue | B23H 1/00 |
| | | | | 219/69.15 |
| 4,476,369 A | * | 10/1984 | Inoue | B23H 1/028 |
| | | | | 219/69.15 |
| 4,659,894 A | * | 4/1987 | Inoue | 219/69.18 |
| 4,667,077 A | * | 5/1987 | Goto | B23H 7/04 |
| | | | | 219/69.1 |
| 4,689,462 A | * | 8/1987 | Goto | B23H 7/02 |
| | | | | 204/206 |
| 4,710,603 A | * | 12/1987 | Obara | 219/69.13 |
| 5,111,017 A | * | 5/1992 | Futamura et al. | 219/69.18 |
| 5,149,931 A | * | 9/1992 | Magara | 219/69.13 |
| 5,585,014 A | * | 12/1996 | Magara | 219/69.13 |
| 6,252,191 B1 | | 6/2001 | D'Amario | |
| 6,566,823 B2 | * | 5/2003 | Kinbara et al. | 315/246 |
| 6,624,377 B2 | * | 9/2003 | Gianchandani et al. | 219/69.13 |
| 2002/0060205 A1 | * | 5/2002 | Tamida et al. | 219/69.18 |
| 2002/0179573 A1 | * | 12/2002 | Gianchandani et al. | 219/69.11 |
| 2007/0023399 A1 | * | 2/2007 | Buhler et al. | 219/69.18 |
| 2007/0023400 A1 | * | 2/2007 | Buhler et al. | 219/69.18 |
| 2011/0163071 A1 | * | 7/2011 | Hashimoto et al. | 219/69.13 |

FOREIGN PATENT DOCUMENTS

| | | | |
|---|---|---|---|
| GB | 2248032 | * | 3/1992 |
| JP | 54 20485 | | 2/1979 |
| JP | 356052133 | * | 5/1981 |
| JP | 357184629 | * | 11/1982 |
| JP | 359134621 | * | 8/1984 |
| JP | 61 260916 | | 11/1986 |
| JP | 61 260917 | | 11/1986 |
| JP | 361260915 | * | 11/1986 |
| JP | 62015015 | * | 1/1987 |
| JP | 363150112 | * | 6/1988 |
| JP | 05038627 | * | 2/1993 |
| JP | 06226538 | * | 8/1994 |
| JP | 09 248719 | | 9/1997 |
| JP | 10128620 | * | 5/1998 |
| JP | 10-202432 | | 8/1998 |
| JP | 11 221717 | | 8/1999 |
| JP | 2000 109397 | | 4/2000 |
| JP | 2002254251 | * | 9/2002 |
| JP | 2003 260617 | | 9/2003 |
| JP | 2007 237348 | | 9/2007 |

OTHER PUBLICATIONS

International Search Report issued Oct. 20, 2009 in PCT/JP09/063198 filed Jul. 23, 2009.

German Office Action issued Sep. 1, 2014, in German Patent Application No. 11 2009 001 764.9 (with English translation).

* cited by examiner

ELECTRIC DISCHARGE MACHINING APPARATUS, ELECTRIC DISCHARGE MACHINING METHOD, AND SEMICONDUCTOR SUBSTRATE MANUFACTURING METHOD

TECHNICAL FIELD

The present invention generally relates to an electric discharge machining apparatus, an electric discharge machining method, and a semiconductor substrate manufacturing method, and specifically relates to an electric discharge machining apparatus that performs electric discharge machining processes simultaneously by using a plurality of electrodes.

BACKGROUND ART

By performing an electric discharge machining process, it is possible to process metal into any desired shape without being affected by the level of hardness of the metal. Electric discharge machining processes are also used as a method for cutting a wafer that has a large diameter out of a semiconductor ingot. During an electric discharge machining process to cut out such a wafer, electric discharges are generated in the manner of pulses, with the electric discharge point being shifted, for the purpose of preventing the level of precision of the machining process from being degraded by having the electric discharge positions concentrated in one place. And due to this, the speed of the machining process tends to be low. To cope with this situation, a method for improving the speed of the machining process has been proposed, as disclosed in Patent Document 1, by which a slicing process is performed on a semiconductor ingot while a plurality of wires are arranged in parallel.

According to this method, however, if the plurality of wires were driven by one electric power source, when one of the wires has an electric discharge, the voltages applied to the other wires would become lower, and it would become impossible to cause the other wires to generate electric discharges. For this reason, it is necessary to provide an electric power source for each of the wires individually, and that leads to a state in which the electric discharge machining apparatus has a large size and a high cost.

Further, to realize excellent processing characteristics that make it possible to obtain, for example, a processed surface having high quality, Patent Document 2 discloses a method by which an alternating-current high-frequency wave is applied to an electrode, while an average processing voltage is arranged to be zero so as to prevent chipping, and also, the electric discharge point is arranged to be different for each electric discharge by switching the polarity for every single half-wave electric discharge.

Further, as a method for causing a plurality of wires to generate electric discharges by using one electric power source, Patent Document 3 discloses a method by which a capacitor is provided so as to be connected in parallel to each of a plurality of electric discharge gaps, and these capacitors are configured so as to be electrically charged via diodes.

PRIOR ART DOCUMENTS

Patent Documents

Patent Document 1: Japanese Patent Application Laid-open No. H9-248719

Patent Document 2: Japanese Patent Application Laid-open No. S61-260917

Patent Document 3: Japanese Patent Application Laid-open No. 2003-260617

DISCLOSURE OF INVENTION

Problem to be Solved by the Invention

According to the conventional technique described above, however, because each of the capacitors is provided so as to be connected in parallel to the corresponding one of the plurality of electric discharge gaps, a direct-current voltage is applied to the electric discharge gaps formed between electrodes and a workpiece, so that it is not possible to apply an alternating-current high-frequency wave to the electrodes. As a result, it is not possible to generate pulse-like electric discharges at a high speed in the electric discharge gaps that are formed between the electrodes and the workpiece. Consequently, a problem arises where it is not possible to perform the machining process at a high speed and where the quality of the processed surface is degraded.

In view of the abovementioned circumstances, it is an object of the present invention to obtain an electric discharge machining apparatus, an electric discharge machining method, and a semiconductor substrate manufacturing method with which it is possible to cause a plurality of electrodes to generate pulse-like electric discharges at a high speed while using one electric power source.

Means for Solving Problem

In order to solve the aforementioned problems and attain the aforementioned object, an electric discharge machining apparatus according to one aspect of the present invention is constructed in such a manner as to include: electrodes whose total quantity is equal to N (where N is an integer that is 2 or larger) and each of which is configured so as to individually generate an electric discharge between the electrodes and a workpiece; either one of an alternating-current power source and a pulse generator that commonly applies an alternating voltage or a voltage pulse between the workpiece and the electrodes whose total quantity is equal to N; and capacitors whose total quantity is equal to N, one end of each of which is commonly connected to the alternating-current power source or to the pulse generator and the other ends of which are individually connected to a corresponding one of the electrodes whose total quantity is equal to N.

Effect of the Invention

According to an aspect of the present invention, an advantageous effect is achieved where it is possible to cause the plurality of electrodes to generate the pulse-like electric discharges at a high speed, while using one electric power source.

BEST MODE(S) FOR CARRYING OUT THE INVENTION

In the following sections, exemplary embodiments of an electric discharge machining apparatus according to the present invention will be explained in detail, with reference to the drawings. The present invention is not limited to these exemplary embodiments.

First Embodiment

Figure 1:
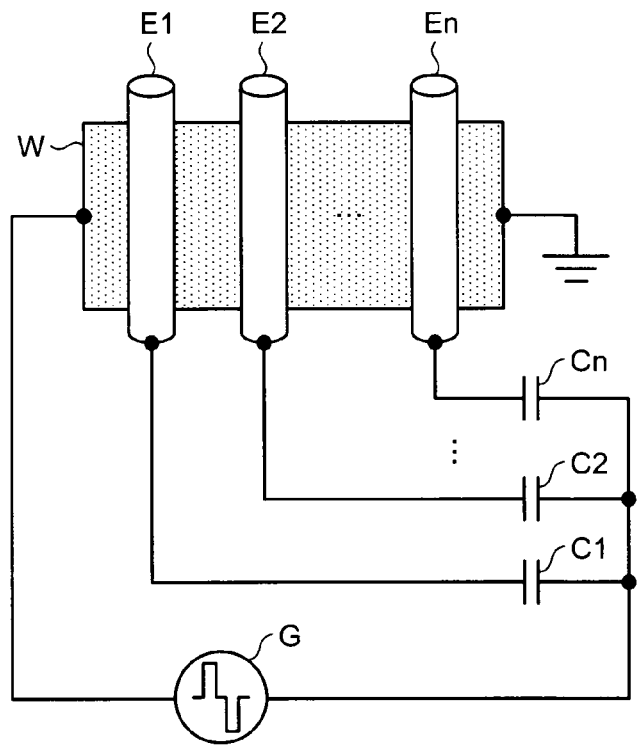
FIG. 1 is a plan view depicting a schematic configuration of an electric discharge machining apparatus according to a first embodiment of the present invention.

FIG. 1 is a plan view depicting a schematic configuration of an electric discharge machining apparatus according to a first embodiment of the present invention. As shown in FIG. 1, the electric discharge machining apparatus includes: electrodes E1 to En the total quantity of which is equal to N (where N is an integer that is 2 or larger); one alternating-current (hereinafter, may be referred to as "AC") power source G; and capacitors C1 to Cn the total quantity of which is equal to N. In this situation, each of the electrodes E1 to En is able to form an electric discharge gap (hereinafter, "discharge gap") between the electrode itself and a workpiece W and is able to generate an electric discharge individually between the electrode itself and the workpiece W via the discharge gap.

The electrodes E1 to En may be configured by using, for example, wire electrodes that are arranged in parallel. Alternatively, the electrodes E1 to En may be configured with split electrodes that are used for, for example, die sinking processes. Further, the workpiece (hereinafter, it may be referred to as a "workpiece object") W may be an electrically-conductive member that is made of metal or the like or may be a semiconductor such as a semiconductor ingot or a semiconductor wafer.

Further, the AC power source G is configured so as to generate an alternating voltage and to apply the generated alternating voltage commonly to the electrodes E1 to En. The waveform of the alternating voltage generated by the AC power source G may be a pulse-like waveform in which the voltage appears both on the positive side and the negative side, or may be a waveform with sinusoidal waves, a waveform with triangular waves, or a waveform with high-frequency waves.

Further, one end of each of the capacitors C1 to Cn is individually connected to the corresponding one of the electrodes E1 to En, whereas the other ends of the capacitors C1 to Cn are commonly connected to the AC power source G. In other words, each of the capacitors C1 to Cn is connected in series to the corresponding one of the discharge gaps that are respectively formed between the workpiece W and the electrodes E1 to En. Further, serial circuits that are constituted with the capacitors C1 to Cn and the discharge gaps are connected in parallel to the AC power source G.

Further, when a negative voltage is applied to the workpiece W, and a positive voltage is applied to the electrodes E1 to En, the capacitors C1 to Cn are electrically charged, and also, a voltage that is lower by an amount corresponding to the voltage occurring in the corresponding one of the capacitors C1 to Cn is applied to each of the discharge gaps that are respectively formed between the workpiece W and the electrodes E1 to En. In this situation, for example, in the case where an electric discharge has occurred in the discharge gap between the electrode E1 and the workpiece W or where electric conduction has been achieved due to a short circuit occurring in the discharge gap between the electrode E1 and the workpiece W, an electric current flows from the electrode E1 toward the workpiece W.

Further, when the electric current flows from the electrode E1 toward the workpiece W, the capacitor C1 is electrically charged in the direction from the electrode E1 toward the workpiece W, so that the voltage occurring in the capacitor C1 rises. Accordingly, because the discharge gap between the electrode E1 and the workpiece W is connected in series to the capacitor C1, the voltage applied to the discharge gap between the electrode E1 and the workpiece W drops by an amount corresponding to the voltage that has risen in the capacitor C1. As a result, because the electric current flowing in the discharge gap between the electrode E1 and the workpiece W disappears, the electric current flowing from the electrode E1 toward the workpiece W becomes like a pulse.

As a result, even in the case where an electric discharge has occurred in the discharge gap between the electrode E1 and the workpiece W, it is possible to prevent the voltage applied to the discharge gap between the electrode E1 and the workpiece W from becoming a voltage of a direct-current nature, and it is possible to generate a pulse-like electric discharge at a high speed. Similarly, between each of the electrodes E2 to En and the workpiece W, it is possible to generate a pulse-like electric discharge at a high speed.

Subsequently, when a positive voltage is applied to the workpiece W, and a negative voltage is applied to the electrodes E1 to En, while the capacitors C1 to Cn are electrically charged in the opposite direction, each of voltages that are obtained by superimposing the voltages occurring in the capacitors C1 to Cn onto the voltage of the AC power source G is applied to the corresponding one of the discharge gaps that are respectively formed between the electrodes E1 to En and the workpiece W, so that the voltages that are higher than the voltage generated by the AC power source G are applied to the discharge gaps.

In this situation, for example, in the case where an electric discharge has occurred in the discharge gap between the electrode E1 and the workpiece W or where electric conduction has been achieved due to a short circuit occurring in the discharge gap between the electrode E1 and the workpiece W, an electric current flows from the workpiece W toward the electrode E1.

Further, when the electric current flows from the workpiece W toward the electrode E1, the capacitor C1 is electrically charged in the direction from the workpiece W toward the electrode E1, so that the voltage occurring in the capacitor C1 drops. Accordingly, because the voltage applied to the discharge gap between the electrode E1 and the workpiece W drops, and also, the electric current flowing in the discharge gap between the electrode E1 and the workpiece W disappears, the electric current flowing from the workpiece W toward the electrode E1 becomes like a pulse. Similarly, between each of the electrodes E2 to En and the workpiece W, it is possible to generate a pulse-like electric discharge at a high speed.

After that, every time the polarity of the AC power source G switches between the positive polarity and the negative polarity, the operation described above is repeated. Thus, every time the polarity of the AC power source G switches, a voltage is individually applied to each of the discharge gaps that are respectively formed between the electrodes E1 to En and the workpiece W, so that an electric discharge is generated.

As explained above, because each of the capacitors C1 to Cn is provided so as to be connected in series to the corresponding one of the discharge gaps that are respectively formed between the electrodes E1 to En and the workpiece W, it is possible to have the voltage stored in each of the capacitors C1 to Cn individually, and it is possible to apply, at all times, the alternating-current high-frequency wave independently to each of the discharge gaps that are respectively formed between the electrodes E1 to En and the workpiece W. Consequently, it is possible to perform the machining process at a high speed in a stable manner.

Let us assume that the capacitors C1 to Cn are not provided. In that situation, because the voltages in the discharge gaps that are respectively formed between the electrodes E1 to En and the workpiece W all have an equal electric potential, when an electric discharge has occurred in one of the discharge gaps, the voltage in the discharge gap in which the electric discharge has occurred drops to a level near zero. As a result, the voltages in all the discharge gaps drop, and it becomes impossible to generate an electric discharge in any of the discharge gaps other than the discharge gap in which the electric discharge occurred first. In other words, with respect to the one voltage applying operation, it is possible to generate an electric discharge only in one of the discharge gaps that are respectively formed between the electrodes E1 to En and the workpiece W. In actuality, there is a possibility that electric discharges may occur in a plurality of places due to impedances between the electric discharge points; however, it is not possible to sustain the electric discharges in all of the discharge gaps that are respectively formed between the electrodes E1 to En and the workpiece W.

In contrast, in the case where the capacitors C1 to Cn are provided so as to be connected in series to the discharge gaps that are respectively formed between the electrodes E1 to En and the workpiece W, even if an electric discharge has occurred in one of the discharge gaps, only the voltage of the one of the capacitors C1 to Cn that is connected in series to the discharge gap changes, and the voltages of the rest of the capacitors C1 to Cn are not affected. For this reason, even in the case where the electrodes E1 to En the total quantity of which is equal to N are driven by the single AC power source G, it is possible to generate electric discharges in the discharge gaps that are respectively formed between the electrodes E1 to En and the workpiece W, in a sustained manner.

In the case where the capacitors C1 to Cn are provided so as to be connected in series to the discharge gaps that are respectively formed between the electrodes E1 to En and the workpiece W, each of the voltages that are obtained by superimposing the voltage of the AC power source G onto the voltages of the capacitors C1 to Cn is applied to the corresponding one of the discharge gaps. As a result, the voltages that are higher than the voltage of the AC power source G are applied to the discharge gaps. Thus, once an electric discharge is started, it is easier to sustain the electric discharge thereafter.

Conversely, if the electric discharge has stopped in one of the discharge gaps, a situation arises where it becomes difficult only for that discharge gap to have an electric discharge thereafter and where the electric discharge machining process is not performed only in that position. To cope with this situation, an arrangement is acceptable in which the electric discharge is resumed by applying a high voltage at least temporarily so as to make it easier to generate an electric discharge in the discharge gap in which the electric discharge has stopped. More specifically, an arrangement is acceptable in which, in the case where it has been detected that the electric discharge in one of the discharge gaps has stopped for a long period of time, a high-voltage pulse is applied. Alternatively, another arrangement is acceptable in which a high-voltage pulse is applied regularly so as to make it easier to generate an electric discharge in the discharge gap in which the electric discharge has stopped.

Each of the voltages applied to the discharge gaps that are respectively formed between the electrodes E1 to En and the workpiece W is a voltage that is divided by the stray capacitance between the corresponding one of the electrodes E1 to En and the workpiece W and by the capacitance of the corresponding one of the capacitors C1 to Cn. Thus, the smaller the capacitance of each of the capacitors C1 to Cn is, the smaller is the voltage applied to the corresponding one of the discharge gaps that are respectively formed between the electrodes E1 to En and the workpiece W. For this reason, it is desirable to configure the capacitances of the capacitors C1 to Cn so as to be larger than the stray capacitances of the discharge gaps that are respectively formed between the electrodes E1 to En and the workpiece W.

It should be noted, however, that the number of times of electric discharges that occur in each of the discharge gaps depends on the frequency of the AC power source G. Thus, to increase the number of times of electric discharges, it is necessary to arrange the frequency of the AC power source G to be higher. In that situation, if the capacitance of each of the capacitors C1 to Cn is arranged to be larger, the impedance of each of the capacitors C1 to Cn becomes smaller, and there is a possibility that the matching with the workpiece W may be lost. For this reason, it is desirable to set the capacitance of each of the capacitors C1 to Cn, taking into consideration not only the voltages applied to the discharge gaps that are respectively formed between the electrodes E1 to En and the workpiece W, but also the matching with the workpiece W.

Second Embodiment

Figure 2:
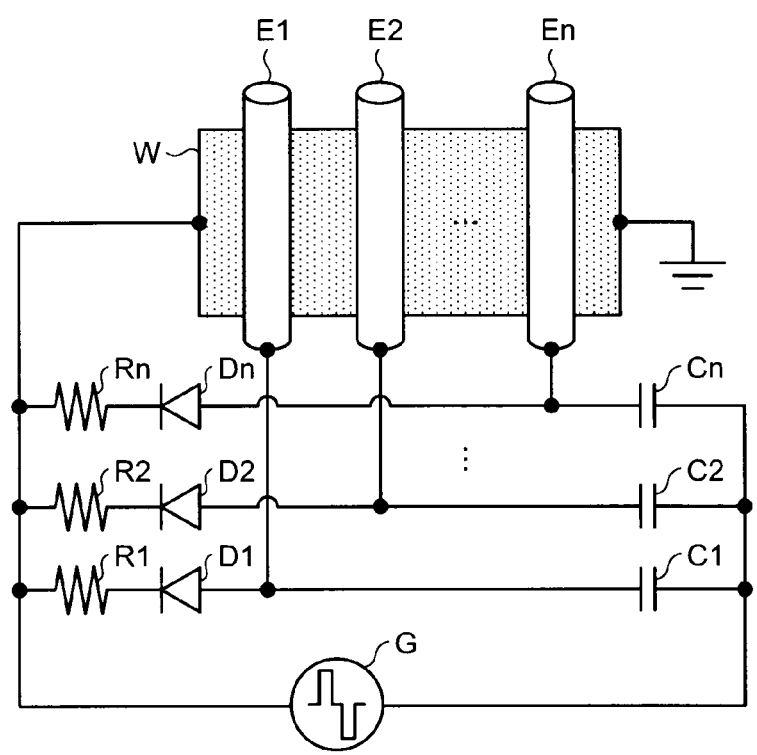
FIG. 2 is a plan view depicting a schematic configuration of an electric discharge machining apparatus according to a second embodiment of the present invention.

FIG. 2 is a plan view depicting a schematic configuration of an electric discharge machining apparatus according to a second embodiment of the present invention. As shown in FIG. 2, in addition to the configuration of the electric discharge machining apparatus shown in FIG. 1, the electric discharge machining apparatus further includes diodes D1 to Dn the total quantity of which is equal to N as well as resistors R1 to Rn the total quantity of which is equal to N. In this situation, the anode of each of the diodes D1 to Dn is individually connected to the corresponding one of the electrodes E1 to En, whereas the cathodes of the diodes D1 to Dn are commonly connected to a terminal of the AC power source G positioned on the workpiece W side, via the corresponding one of the resistors R1 to Rn.

In other words, each of the capacitors C1 to Cn is connected in series to the corresponding one of the discharge gaps that are respectively formed between the workpiece W and the electrodes E1 to En. Further, the serial circuits that are constituted with the capacitors C1 to Cn and the discharge gaps are connected in parallel to the AC power source G. Further, serial circuits that are constituted with the capacitors C1 to Cn, the diodes D1 to Dn, and the resistors R1 to Rn are connected in parallel to the AC power source G.

In this situation, let us assume that the workpiece W is a semiconductor. In that situation, diode characteristics are observed between a metal platform on which the workpiece W is fixed and the workpiece W that is made of the semiconductor, so that no electric current flows from each of the electrodes E1 to En to the workpiece W.

In other words, when a positive voltage is applied to the workpiece W, and a negative voltage is applied to the electrodes E1 to En, an electric current flows from the workpiece W to each of the electrodes E1 to En, so that an electric discharge occurs in each of the discharge gaps that are respectively formed between the electrodes E1 to En and the workpiece W. In this situation, even in the case where an electric discharge has occurred in one of the discharge gaps first, only the voltage of the one of the capacitors C1 to Cn that is connected in series to the discharge gap changes, and the voltages of the rest of the capacitors C1 to Cn are not affected. For this reason, even in the case where the electrodes E1 to En the total quantity of which is equal to N are driven by the single AC power source G, it is possible to generate electric discharges in the discharge gaps that are respectively formed between the electrodes E1 to En and the workpiece W, in a sustained manner.

In contrast, when a negative voltage is applied to the workpiece W, and a positive voltage is applied to the electrodes E1 to En, an electric current flows via each of the diodes D1 to Dn and each of the resistors R1 to Rn. As a result, a voltage that is only at a level corresponding to the voltage drops due to the diodes D1 to Dn and the resistors R1 to Rn is applied to the electrodes E1 to En. Consequently, no electric discharge occurs in the discharge gaps that are respectively formed between the electrodes E1 to En and the workpiece W. Further, the electric power that corresponds to a half cycle during which a negative voltage is applied to the workpiece W and a positive voltage is applied to the electrodes E1 to En is consumed by the resistors R1 to Rn.

As a result, even in the case where the workpiece W is configured with a semiconductor, it is possible to perform an electric discharge machining process on the workpiece W in a stable manner. It is therefore possible to perform a slicing process on a semiconductor ingot by using a large number of wires at the same time so as to cut out a plurality of semiconductor substrates at the same time, while degradation of the processing characteristics of the workpiece W is inhibited.

Third Embodiment

Figure 3:
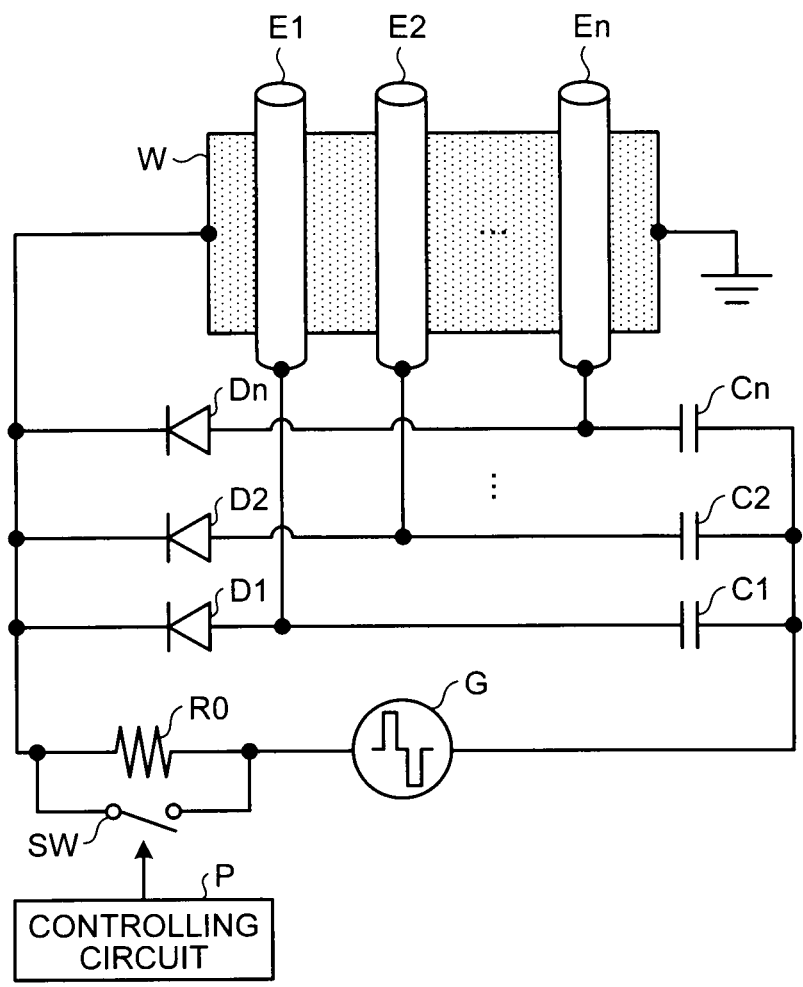
FIG. 3 is a plan view depicting a schematic configuration of an electric discharge machining apparatus according to a third embodiment of the present invention.

FIG. 3 is a plan view depicting a schematic configuration of an electric discharge machining apparatus according to a third embodiment of the present invention. As shown in FIG. 3, instead of the resistors R1 to Rn shown in FIG. 2, the electric discharge machining apparatus includes a resistor R0, a switching element SW, and a controlling circuit P. In this situation, the anode of each of the diodes D1 to Dn is individually connected to the corresponding one of the electrodes E1 to En, whereas the cathodes of the diodes D1 to Dn are commonly connected to a terminal of the AC power source G positioned on the workpiece W side. Further, the resistor R0 is connected in series to the AC power source G, whereas the switching element SW is connected in parallel to the resistor R0.

In other words, each of the capacitors C1 to Cn is connected in series to the corresponding one of the discharge gaps that are respectively formed between the workpiece W and the electrodes E1 to En. Further, the serial circuits that are constituted with the capacitors C1 to Cn and the discharge gaps are connected in parallel to the serial circuit that is constituted with the AC power source G and the resistor R0. Further, serial circuits that are constituted with the capacitors C1 to Cn and the diodes D1 to Dn are connected in parallel to the serial circuit that is constituted with the AC power source G and the resistor R0.

Further, the controlling circuit P is configured so as to turn on the switching element SW in a half cycle during which a positive voltage is applied to the workpiece W, and so as to turn off the switching element SW in a half cycle during which a negative voltage is applied to the workpiece W.

In the case where the workpiece W is configured with a semiconductor, in the half cycle during which a positive voltage is applied to the workpiece W, the switching element SW is turned on. Further, when a positive voltage is applied to the workpiece W, and a negative voltage is applied to the electrodes E1 to En, an electric current flows from the workpiece W to each of the electrodes E1 to En, so that an electric discharge occurs in each of the discharge gaps that are respectively formed between the electrodes E1 to En and the workpiece W. In this situation, even in the case where an electric discharge has occurred in one of the discharge gaps first, only the voltage of the one of the capacitors C1 to Cn that is connected in series to the discharge gap changes, and the voltages of the rest of the capacitors C1 to Cn are not affected. For this reason, even in the case where the electrodes E1 to En the total quantity of which is equal to N are driven by the single AC power source G, it is possible to generate electric discharges in the discharge gaps that are respectively formed between the electrodes E1 to En and the workpiece W, in a sustained manner.

In contrast, in the half cycle during which a negative voltage is applied to the workpiece W, the switching element SW is turned off. Further, when a negative voltage is applied to the workpiece W, and a positive voltage is applied to the electrodes E1 to En, after an electric current has flowed via each of the diodes D1 to Dn, these flows of electric current join together and flow into the resistor R0. As a result, the voltage that is only at a level corresponding to the voltage drops due to the diodes D1 to Dn is applied to the electrodes E1 to En. Consequently, no electric discharge occurs in the discharge gaps that are respectively formed between the electrodes E1 to En and the workpiece W. Further, the electric power that corresponds to the half cycle during which a negative voltage is applied to the workpiece W and a positive voltage is applied to the electrodes E1 to En is consumed by the resistor R0.

As a result, even in the case where the workpiece W is configured with a semiconductor, it is possible to perform an electric discharge machining process on the workpiece W in a stable manner. It is therefore possible to perform a slicing process on a semiconductor ingot by using a large number of wires at the same time, while degradation of the processing characteristics of the workpiece W is inhibited. Further, even in the case where an electric current flows in each of the diodes D1 to Dn individually, it is possible to cause the electric power corresponding to the half cycle to be consumed, by providing the single resistor, i.e., the resistor R0. Consequently, because there is no need to provide the diodes D1 to Dn with the resistors R1 to Rn, respectively, as shown in FIG. 2, it is possible to make the electric discharge machining apparatus compact.

Fourth Embodiment

Figure 4:
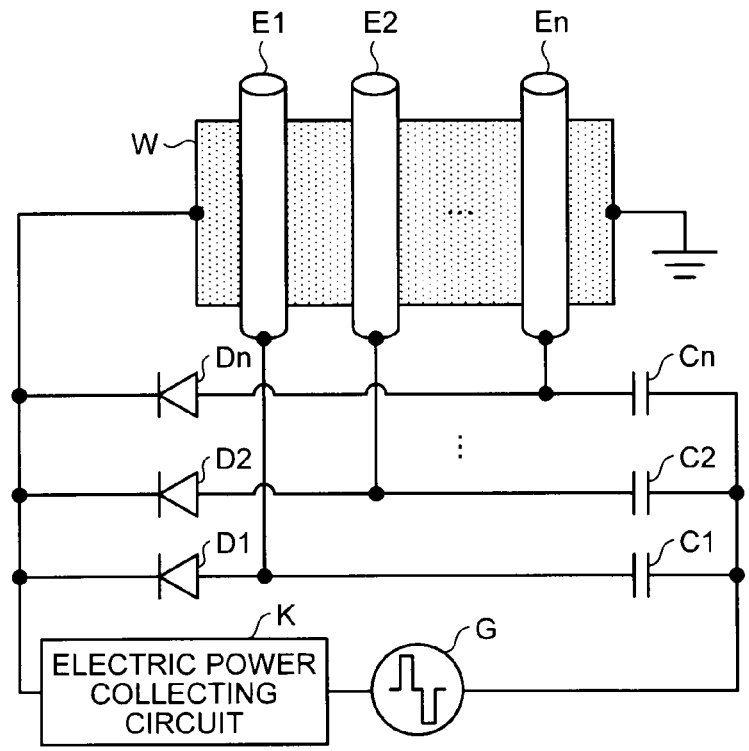
FIG. 4 is a plan view depicting a schematic configuration of an electric discharge machining apparatus according to a fourth embodiment of the present invention.

FIG. 4 is a plan view depicting a schematic configuration of an electric discharge machining apparatus according to a fourth embodiment of the present invention. As shown in FIG. 4, the electric discharge machining apparatus includes an electric power collection circuit K, instead of the resistor R0, the switching element SW, and the controlling circuit P that are shown in FIG. 3. In this situation, the anode of each of the diodes D1 to Dn is individually connected to the corresponding one of the electrodes E1 to En, whereas the cathodes of the diodes D1 to Dn are commonly connected to a terminal of the AC power source G positioned on the workpiece W side. Further, the electric power collection circuit K is connected in series to the AC power source G.

In other words, each of the capacitors C1 to Cn is connected in series to the corresponding one of the discharge gaps that are respectively formed between the workpiece W and the electrodes E1 to En. Further, the serial circuits that are constituted with the capacitors C1 to Cn and the discharge gaps are connected in parallel to the serial circuit that is constituted with the AC power source G and the electric power collection circuit K. Further, the serial circuits that are constituted with the capacitors C1 to Cn and the diodes D1 to Dn are connected in parallel to the serial circuit that is constituted with the AC power source G and the electric power collection circuit K.

Further, the electric power collection circuit K is configured so as to collect the electric power in the half cycle during which a negative voltage is applied to the workpiece W and to re-use the thus collected electric power. For example, it is possible to use the collected electric power as an auxiliary power source to the AC power source G, by storing the electric power corresponding to the half cycle during which a negative voltage is applied to the workpiece W into a storage battery and converting the direct current stored in the storage battery into an alternating current.

Further, in the case where the workpiece W is configured with a semiconductor, when a positive voltage is applied to the workpiece W, and a negative voltage is applied to the electrodes E1 to En, an electric current flows from the workpiece W to each of the electrodes E1 to En, so that an electric discharge occurs in each of the discharge gaps that are respectively formed between the electrodes E1 to En and the workpiece W. In this situation, even in the case where an electric discharge has occurred in one of the discharge gaps first, only the voltage of the one of the capacitors C1 to Cn that is connected in series to the discharge gap changes, and the voltages of the rest of the capacitors C1 to Cn are not affected. For this reason, even in the case where the electrodes E1 to En the total quantity of which is equal to N are driven by the single AC power source G, it is possible to generate electric discharges in the discharge gaps that are respectively formed between the electrodes E1 to En and the workpiece W, in a sustained manner.

In contrast, when a negative voltage is applied to the workpiece W, and a positive voltage is applied to the electrodes E1 to En, after an electric current has flowed via each of the diodes D1 to Dn, these flows of electric current join together and flow into the electric power collection circuit K. As a result, the voltage that is only at a level corresponding to the voltage drops due to the diodes D1 to Dn is applied to the electrodes E1 to En. Consequently, no electric discharge occurs in the discharge gaps that are respectively formed between the electrodes E1 to En and the workpiece W. Further, the electric power that corresponds to the half cycle during which a negative voltage is applied to the workpiece W and a positive voltage is applied to the electrodes E1 to En is collected by the electric power collection circuit K and can be used for driving the electrodes E1 to En in the next half cycle.

As a result, even in the case where the workpiece W is configured with a semiconductor, it is possible to perform an electric discharge machining process on the workpiece W in a stable manner. It is therefore possible to perform a slicing process on a semiconductor ingot by using a large number of wires at the same time, while degradation of the processing characteristics of the workpiece W is inhibited. In addition, it is possible to prevent the electric power corresponding to the half cycle from being wastefully consumed by the resistor R0. Consequently, it is possible to improve efficiency of the power source used for electric discharge machining processes.

Fifth Embodiment

Figure 5:
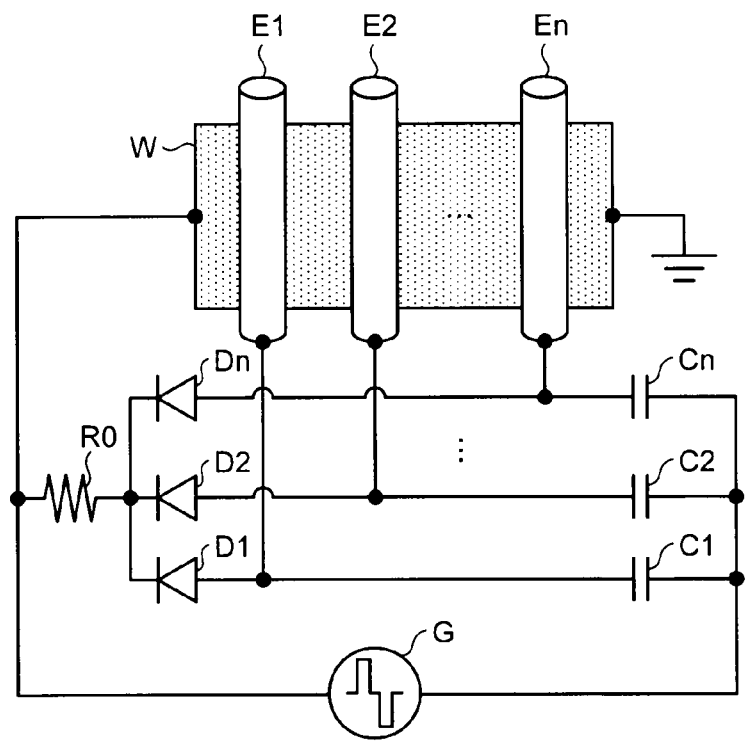
FIG. 5 is a plan view depicting a schematic configuration of an electric discharge machining apparatus according to a fifth embodiment of the present invention.

FIG. 5 is a plan view depicting a schematic configuration of an electric discharge machining apparatus according to a fifth embodiment of the present invention. As shown in FIG. 5, the electric discharge machining apparatus includes the resistor R0, instead of the resistors R1 to Rn shown in FIG. 2. In this situation, the anode of each of the diodes D1 to Dn is individually connected to the corresponding one of the electrodes E1 to En, whereas the cathodes of the diodes D1 to Dn are commonly connected to a terminal of the AC power source G positioned on the workpiece W side, via the resistor R0.

In other words, each of the capacitors C1 to Cn is connected in series to the corresponding one of the discharge gaps that are respectively formed between the workpiece W and the electrodes E1 to En. Further, the serial circuits that are constituted with the capacitors C1 to Cn and the discharge gaps are connected in parallel to the AC power source G. Further, a serial circuit that is obtained by connecting the resistor R0 in series to parallel circuits in which the serial circuits that are constituted with the capacitors C1 to Cn and the diodes D1 to Dn are connected in parallel to one another is connected in parallel to the AC power source G.

In the case where the workpiece W is configured with a semiconductor, when a positive voltage is applied to the workpiece W, and a negative voltage is applied to the electrodes E1 to En, an electric current flows from the workpiece W to each of the electrodes E1 to En, so that an electric discharge occurs in each of the discharge gaps that are respectively formed between the electrodes E1 to En and the workpiece W. In this situation, even in the case where an electric discharge has occurred in one of the discharge gaps first, only the voltage of the one of the capacitors C1 to Cn that is connected in series to the discharge gap changes, and the voltages of the rest of the capacitors C1 to Cn are not affected. For this reason, even in the case where the electrodes E1 to En the total quantity of which is equal to N are driven by the single AC power source G, it is possible to generate electric discharges in the discharge gaps that are respectively formed between the electrodes E1 to En and the workpiece W, in a sustained manner.

In contrast, when a negative voltage is applied to the workpiece W, and a positive voltage is applied to the electrodes E1 to En, after an electric current has flowed via each of the diodes D1 to Dn, these flows of electric current join together and flow into the resistor R0. As a result, the voltage that is only at a level corresponding to the voltage drops due to the diodes D1 to Dn and the resistor R0 is applied to the electrodes E1 to En. Consequently, no electric discharge occurs in the discharge gaps that are respectively formed between the electrodes E1 to En and the workpiece W. Further, the electric power that corresponds to the half cycle during which a negative voltage is applied to the workpiece W and a positive voltage is applied to the electrodes E1 to En is consumed by the resistor R0.

As a result, even in the case where the workpiece W is configured with a semiconductor, it is possible to perform an electric discharge machining process on the workpiece W in a stable manner. It is therefore possible to perform a slicing process on a semiconductor ingot by using a large number of wires at the same time, while degradation of the processing characteristics of the workpiece W is inhibited. Further, even in the case where an electric current flows in each of the diodes D1 to Dn individually, it is possible to cause the electric power corresponding to the half cycle to be consumed, by providing the single resistor, i.e., the resistor R0. In addition, because there is no need to provide the switching element SW shown in FIG. 3, it is possible to make the electric discharge machining apparatus compact and to reduce the cost thereof.

Sixth Embodiment

Figure 6:
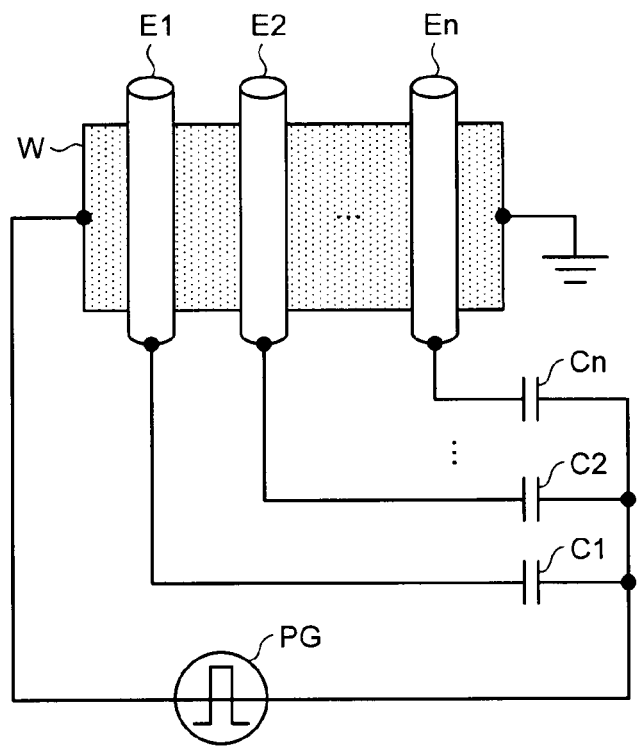
FIG. 6 is a plan view depicting a schematic configuration of an electric discharge machining apparatus according to a sixth embodiment of the present invention.

FIG. 6 is a plan view depicting a schematic configuration of an electric discharge machining apparatus according to a sixth embodiment of the present invention. As shown in FIG. 6, the electric discharge machining apparatus includes a pulse generator PG, instead of the AC power source G shown in FIG. 1.

In this situation, the AC power source G generates a waveform in which the voltage fluctuates both on the positive side and the negative side, whereas the pulse generator PG generates a pulse waveform in which the voltage fluctuates only on the positive side or only on the negative side. It should be noted that, however, because each of the capacitors C1 to Cn is connected in series to the corresponding one of the discharge gaps that are respectively formed between the workpiece W and the electrodes E1 to En in the configuration shown in FIG. 6, only an alternating current is able to flow, and the direct-current component of the electric current is not able to pass. As a result, even if the pulse generator PG performs a single-polarity pulse driving process, it is, in actuality, as if an alternating-current driving process was performed. Thus, it is acceptable to use the pulse generator PG (having either single polarity or bi-polarity), instead of the AC power source G shown in FIG. 1.

Seventh Embodiment

Figure 7:
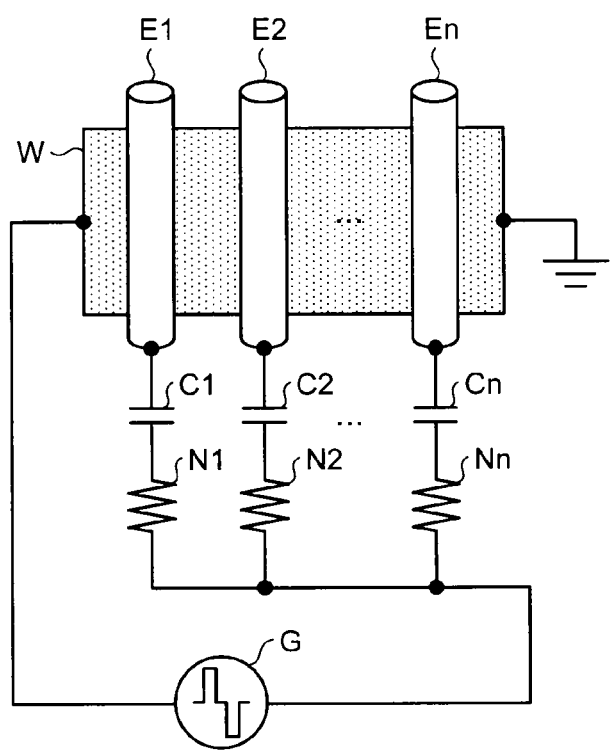
FIG. 7 is a plan view depicting a schematic configuration of an electric discharge machining apparatus according to a seventh embodiment of the present invention.

FIG. 7 is plan view depicting a schematic configuration of an electric discharge machining apparatus according to a seventh embodiment of the present invention. As shown in FIG. 7, in addition to the configuration of the electric discharge machining apparatus shown in FIG. 1, the electric discharge machining apparatus further includes resistors N1 to Nn the total quantity of which is equal to N. In this situation, each of the resistors N1 to Nn the total quantity of which is equal to N is connected in series to the corresponding one of the capacitors C1 to Cn the total quantity of which is equal to N.

In this situation, when an electric discharge has occurred in a space formed by one of the electrodes E1 to En, the capacitors C1 to Cn make it more difficult for the influence of the electric discharge to be transmitted to the rest of the electrodes E1 to En. However, although changes of a direct-current nature (e.g., a change in the electric potential) are inhibited by the capacitors C1 to Cn, a displacement current caused by the change in the electric potential is able to flow through the capacitors C1 to Cn.

To cope with this situation, by connecting each of the resistors N1 to Nn in series to the corresponding one of the capacitors C1 to Cn, it is possible to inhibit the pulse-like current caused by the change in the electric potential with the use of the resistors N1 to Nn. Consequently, it is possible to enhance independency of the machining process performed with each of the electrodes.

Each of the resistors N1 to Nn described above may be of a stray type such as, for example, a resistance of a wiring or a resistance caused by a capacitor or an electrode structure.

Eighth Embodiment

Figure 8:
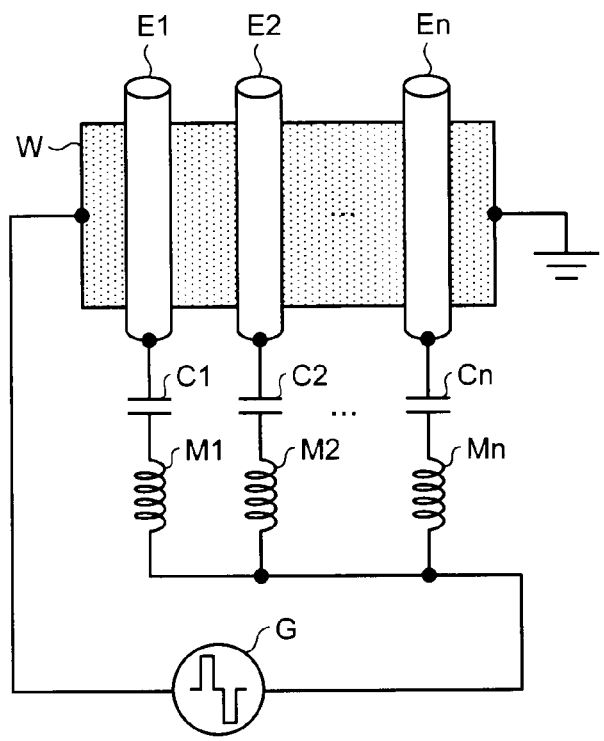
FIG. 8 is a plan view depicting a schematic configuration of an electric discharge machining apparatus according to an eighth embodiment of the present invention.

FIG. 8 is a plan view depicting a schematic configuration of an electric discharge machining apparatus according to an eighth embodiment of the present invention. As shown in FIG. 8, in addition to the configuration of the electric discharge machining apparatus shown in FIG. 1, the electric discharge machining apparatus further includes inductors M1 to Mn the total quantity of which is equal to N. In this situation, each of the inductors M1 to Mn the total quantity of which is equal to N is connected in series to the corresponding one of the capacitors C1 to Cn the total quantity of which is equal to N.

In this situation, by connecting each of the inductors M1 to Mn the total quantity of which is equal to N in series to the corresponding one of the capacitors C1 to Cn the total quantity of which is equal to N, it is possible to make it more difficult for a pulse-like electric current to flow, so that it is easier to cause an electric discharge to occur at each of the electric discharge points independently. Further, by using the inductors M1 to Mn, it is possible to reduce losses than in the case where the resistors N1 to Nn are used as shown in FIG. 7.

Each of the inductors M1 to Mn described above may be of a stray type such as, for example, an inductance of a wiring or an inductance caused by an electrode structure.

Ninth Embodiment

Figure 9:
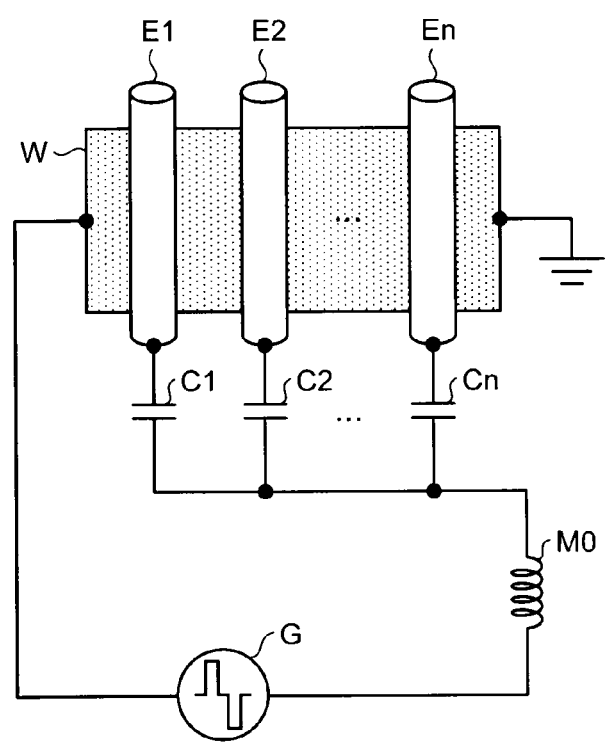
FIG. 9 is a plan view depicting a schematic configuration of an electric discharge machining apparatus according to a ninth embodiment of the present invention.

FIG. 9 is a plan view depicting a schematic configuration of an electric discharge machining apparatus according to a ninth embodiment of the present invention. As shown in FIG. 9, in addition to the configuration of the electric discharge machining apparatus shown in FIG. 1, the electric discharge machining apparatus further includes one inductor M0. In this situation, the inductor M0 is connected in series to the AC power source G. In this situation, it is desirable to drive the AC power source G at a frequency that is close to a resonant frequency between the inductor M0 and the capacitors C1 to Cn the total quantity of which is equal to N.

In this situation, by driving the AC power source G at the frequency that is close to the resonant frequency between the inductor M0 and the capacitors C1 to Cn the total quantity of which is equal to N, it is possible to generate a voltage resonance between the inductor M0 and the capacitors C1 to Cn the total quantity of which is equal to N, and it is possible to have the voltage raised by the voltage resonance. Consequently, it is possible to easily apply a high voltage to the ends of the capacitors C1 to Cn and to make it easier to generate inter-polar electric discharges.

The inductor M0 described above may be of a stray type such as, for example, an inductance of a wiring or an inductance caused by an electrode structure.

Tenth Embodiment

Figure 10:
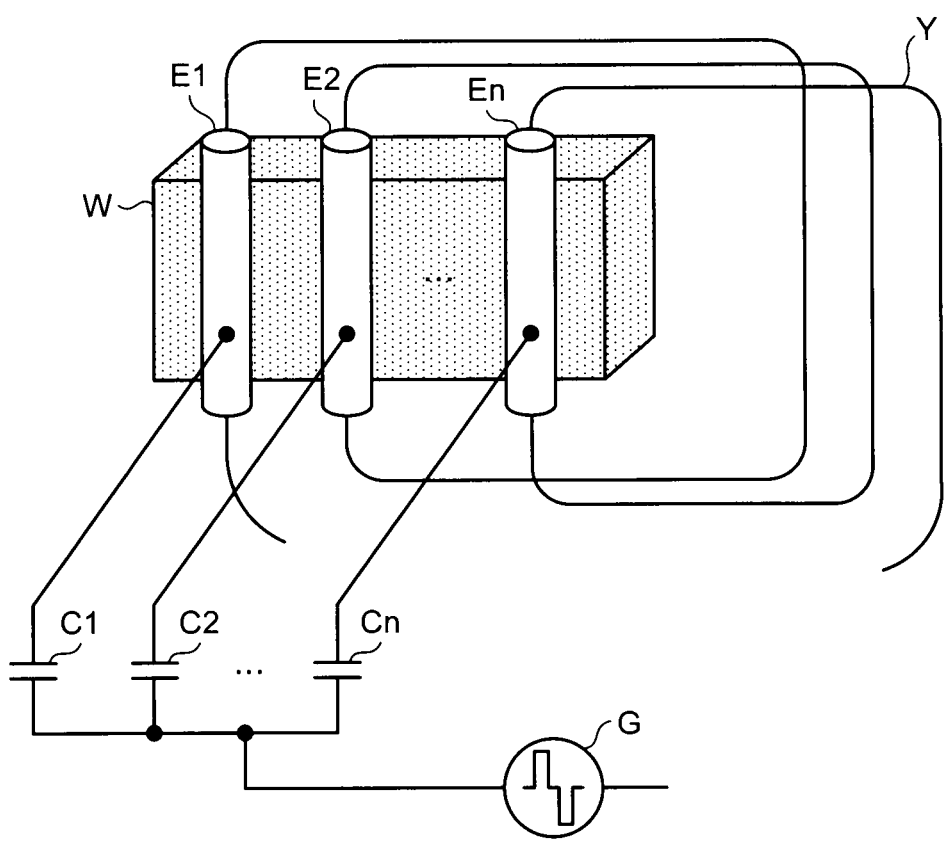
FIG. 10 is a plan view depicting a schematic configuration of an electric discharge machining apparatus according to a tenth embodiment of the present invention.

FIG. 10 is a plan view depicting a schematic configuration of an electric discharge machining apparatus according to a tenth embodiment of the present invention. As shown in FIG. 10, in the electric discharge machining apparatus, each of the electrodes E1 to En is configured by using a mutually-different part of a single wire Y. In this situation, when each of the electrodes E1 to En is configured by using a mutually-different part of the single wire Y, it is desirable to arrange the impedances between the electrodes E1 to En to be as high as possible, for the purpose of enabling to effectively suppress the influence of fluctuations in the voltages between the electrodes E1 to En by inserting the capacitors C1 to Cn the total quantity of which is equal to N. The impedances between the electrodes E1 to En may be of a stray type.

In this situation, when each of the electrodes E1 to En is configured by using a mutually-different part of the single wire Y, it is possible to move the electrodes E1 to En by providing the single wire Y with a reel or a forwarding mechanism. Thus, there is no need to provide each of the electrodes E1 to En the total quantity of which is equal to N with a reel or a forwarding mechanism individually. Consequently, it is possible to simplify the configuration of the electric discharge machining apparatus.

Eleventh Embodiment

Figure 11:
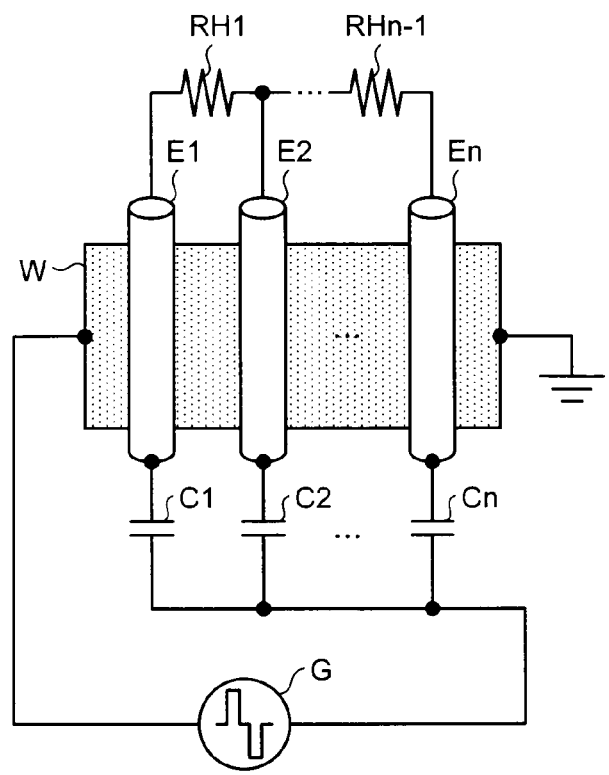
FIG. 11 is a plan view depicting a schematic configuration of an electric discharge machining apparatus according to an eleventh embodiment of the present invention.

FIG. 11 is a plan view depicting a schematic configuration of an electric discharge machining apparatus according to an eleventh embodiment of the present invention. As shown in FIG. 11, in addition to the configuration of the electric discharge machining apparatus shown in FIG. 1, the electric discharge machining apparatus further includes resistors RH1 to RHn−1 the total quantity of which is equal to N−1. In this situation, each of the resistors RH1 to RHn−1, the total quantity of which is equal to N−1, is connected to between corresponding two of the electrodes E1 to En.

In this situation, it is possible to configure each of the electrodes E1 to En by using a mutually-different part of the single wire Y, as shown in FIG. 10. Also, it is possible to configure the resistors RH1 to RHn−1 by using the wire Y itself. In this situation, for the purpose of arranging the resistance value of each of the resistors RH1 to RHn−1 to be high, it is possible to, for example, guide the wire Y so as to provide connections between the electrodes E1 to En, so that the wire Y providing the connections between the electrodes E1 to En is configured in the form of a loop.

Twelfth Embodiment

Figure 12:
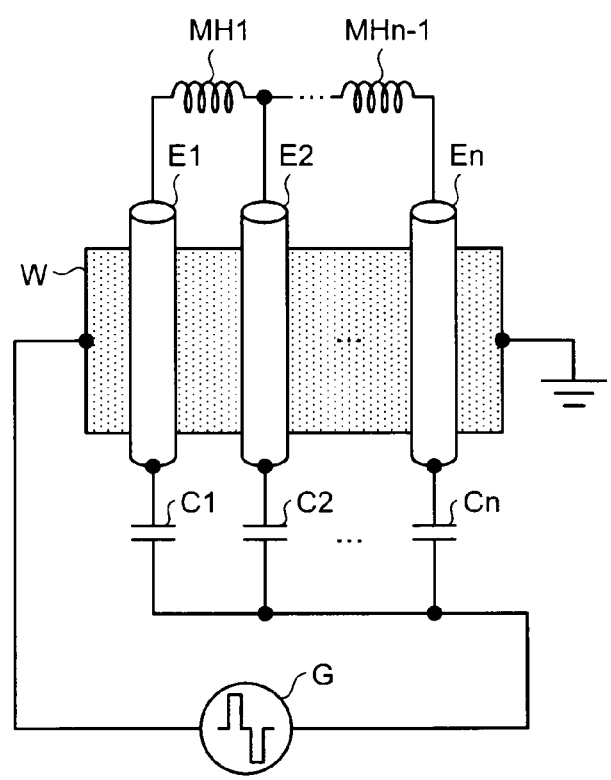
FIG. 12 is a plan view depicting a schematic configuration of an electric discharge machining apparatus according to a twelfth embodiment of the present invention.

FIG. 12 is a plan view depicting a schematic configuration of an electric discharge machining apparatus according to a twelfth embodiment of the present invention. As shown in FIG. 12, in addition to the configuration of the electric discharge machining apparatus shown in FIG. 1, the electric discharge machining apparatus further includes inductors MH1 to MHn−1 the total quantity of which is equal to N−1. In this situation, each of the inductors MH1 to MHn−1 the total quantity of which is equal to N−1 is connected to between corresponding two of the electrodes E1 to En.

In this situation, it is possible to configure each of the electrodes E1 to En by using a mutually-different part of the single wire Y, as shown in FIG. 10. Also, it is possible to configure the inductors MH1 to MHn−1 by using the wire Y itself. In this situation, for the purpose of arranging the value of each of the inductors MH1 to MHn−1 to be high, it is desirable, for example, to configure the wire Y providing the connections between the electrodes E1 to En so as to be in the form of a loop, and also, to insert a magnetic material having a high level of magnetic permeability to inside of the loop. The magnetic material may be, for example, ferrite.

In the case where the electrodes E1 to En are configured by using the single wire Y, it is not possible to electrically insulate the electrodes E1 to En from one another completely. It is therefore not possible to prevent a direct-current-like electric current from flowing between the electrodes E1 to En. However, it should be noted that, as long as there is a certain degree of impedance of a resistance nature or of an inductance nature between the electrodes E1 to En, each of the electrodes E1 to En is not very much influenced by fluctuations in the voltage of the other ones of the electrodes E1 to En during a short period of time in which an electric discharge occurs. In that situation, even if the electrodes E1 to En are configured by using the single wire Y, it is possible to cause each of the electrodes E1 to En to generate an electric discharge independently.

INDUSTRIAL APPLICABILITY

As explained above, the electric discharge machining apparatus according to the present invention is suitable for the method by which a plurality of electrodes are caused to generate pulse-like electric discharges at a high speed while using one electric power source and is suitable for the method by which, for example, a slicing process is performed on a semiconductor ingot while a plurality of wires are arranged in parallel.

EXPLANATIONS OF LETTERS OR NUMERALS

W Workpiece
G Alternating-current (AC) power source
PG Pulse generator
E1 to En Electrodes
C1 to Cn Capacitors
D1 to Dn Diodes
R0; R1 to Rn; N1 to Nn; and RH1 to RHn−1 Resistors
SW Switching element
K Electric power collection circuit P Controlling circuit
M0; M1 to Mn; and MH1 to MHn−1 Inductors
Y Wire

The invention claimed is:

1. An electric discharge machining apparatus comprising:
a plurality of electrodes, whose total quantity is equal to N (where N is an integer), each of the electrodes is arranged adjacent to a workpiece and separated from the workpiece by an electric discharge gap;
either one of an alternating-current power source and a pulse generator that applies an alternating voltage or a voltage pulse to each discharge gap;
a plurality of capacitors, whose total quantity is equal to N, a first end of each capacitor being connected to a first end of the alternating-current power source or the pulse generator, and a second end of each capacitor being connected to a different one of the electrodes; and
a plurality of diodes, whose total quantity is equal to N, a cathode of each diode is connected to a second end of the alternating-current power source or the pulse generator, and an anode of each diode is connected to a corresponding one of the electrodes and a corresponding one of the capacitors, wherein
the workpiece comprises a semiconductor,
each of the N capacitors, a corresponding one of the N electrodes, and a corresponding one of the N discharge gaps are connected in series to form N first serial circuits,
the N capacitors and respectively corresponding N diodes form N second serial circuits that are parallel connected to the alternating-current power source or the pulse generator, and
when charging, the alternating-current power source or the pulse generator applies the alternating voltage or the voltage pulse simultaneously to each of the N first serial circuits, and when discharging, an electric discharge to any one of the N discharge gaps occurs while electric discharges to the others of the N discharge gaps are sustained.

2. The electric discharge machining apparatus according to claim 1, further comprising:
resistors, each of which is connected in series to a corresponding one of the diodes.

3. The electric discharge machining apparatus according to claim 1, further comprising:
a resistor that is connected in series to the alternating-current power source or to the pulse generator;
a switching element that is connected in parallel to the resistor; and
a controlling circuit that turns on the switching element during a time period in which a positive voltage is applied to the workpiece and turns off the switching element during a time period in which a negative voltage is applied to the workpiece.

4. An electric discharge machining method comprising the steps of:
disposing a workpiece in a position where the workpiece opposes electrodes, which are wire electrodes arranged in parallel and the total quantity of which is equal to N (where N is an integer), and forming N electric discharge gaps between the respective N electrodes and the workpiece;
connecting a first end of each of N capacitors to a first end of an alternating-current power source or a pulse generator;
connecting a second end of each of the N capacitors to a different one of the electrodes and an anode of each of N diodes;
series connecting a cathode of each of the N diodes to a second end of the alternating current power source or the pulse generator;
connecting each of the N capacitors, a corresponding one of the N electrodes, and a corresponding one of the N discharge gaps to form N first serial circuits;
respectively parallel connecting the N capacitors and corresponding N diodes from N second serial circuits to the alternating-current power source or the pulse generator, and
simultaneously applying, when charging, an alternating-current voltage or a voltage pulse from the alternating-current power source or the pulse generator, respectively, to each of the N first serial circuits; and
applying, when discharging, to each of the N discharge gaps a voltage that is obtained by superimposing a voltage generated in each capacitor onto the alternating voltage or the voltage pulse so that an electric discharge to any one of the N discharge gaps occurs while electric discharges to the others of the N discharge gaps are sustained, wherein
each of the wire electrodes is a mutually-different part of a single wire.

5. A semiconductor substrate manufacturing method by which a plurality of semiconductor substrates are simultaneously cut out by using the electric discharge machining method according to claim 4.

* * * * *